United States Patent
Isaacs et al.

(10) Patent No.: US 10,388,074 B2
(45) Date of Patent: Aug. 20, 2019

(54) GENERATING IMMERSIVE MEDIA VISUALIZATIONS FOR LARGE DATA SETS

(71) Applicant: INTUIT INC., Mountain View, CA (US)

(72) Inventors: Dickon Isaacs, Mountain View, CA (US); Ashlee Beggs, Mountain View, CA (US); Molly Beth Davis, Mountain View, CA (US); Todd Elliott, Mountain View, CA (US); Xue Ding, Mountain View, CA (US)

(73) Assignee: INTUIT INC., Mountain View, CA (US)

( * ) Notice: Subject to any disclaimer, the term of this patent is extended or adjusted under 35 U.S.C. 154(b) by 192 days.

(21) Appl. No.: 15/465,438

(22) Filed: Mar. 21, 2017

(65) Prior Publication Data

US 2018/0276892 A1    Sep. 27, 2018

(51) Int. Cl.
*G06T 19/00* (2011.01)
*G06F 16/904* (2019.01)

(52) U.S. Cl.
CPC .......... *G06T 19/006* (2013.01); *G06F 16/904* (2019.01)

(58) Field of Classification Search
None
See application file for complete search history.

(56) References Cited

U.S. PATENT DOCUMENTS

| | | | |
|---|---|---|---|
| 9,270,518 B2* | 2/2016 | Muro | G06Q 10/06 |
| 2007/0094041 A1* | 4/2007 | Coale | G06F 3/04815 |
| | | | 345/419 |
| 2014/0019202 A1* | 1/2014 | Mamic | G06Q 30/0201 |
| | | | 705/7.29 |

(Continued)

FOREIGN PATENT DOCUMENTS

| | | |
|---|---|---|
| WO | 03/032125 A2 | 4/2003 |
| WO | WO-2009154484 A2 * | 12/2009 ............. G06Q 10/10 |

OTHER PUBLICATIONS

Ronan Jamieson, Vassil Alexandrov, A Data Forest: Multi-Dimensional Visualization, 2007, 11th International Conference Information Visualization (IV '07), pp. 1-6, ISBN: 0-7695-2900-3 (Year: 2007).*

(Continued)

*Primary Examiner* — Michael J Cobb
(74) *Attorney, Agent, or Firm* — Patterson + Sheridan, LLP

(57) ABSTRACT

The present disclosure relates to the generation of immersive media experience visualizations of a data set. An example method generally includes receiving, from a data source, a data set including a plurality of discrete data points summarizing data in the data set. A visualization engine generates an immersive media experience visualization of the data set. The immersive media experience visualization generally includes one or more objects corresponding to each of the plurality of discrete data points, and an appearance of each of the one or more objects is based, at least in part, on a (Continued)

comparison of a data point associated with an object and a baseline value associated with the data point. The visualization engine transmits the generated immersive media experience visualization of the data set to an immersive experience viewer for display.

20 Claims, 10 Drawing Sheets

(56) References Cited

U.S. PATENT DOCUMENTS

| | | | |
|---|---|---|---|
| 2014/0114845 A1* | 4/2014 | Rogers | G06T 15/08 |
| | | | 705/39 |
| 2014/0274308 A1* | 9/2014 | Guinn | G07F 17/3244 |
| | | | 463/25 |
| 2015/0088808 A1 | 3/2015 | Tyagi et al. | |
| 2018/0158245 A1* | 6/2018 | Govindan | G06T 11/206 |
| 2018/0268578 A1* | 9/2018 | Wittkopf | G06T 11/206 |
| 2018/0352172 A1* | 12/2018 | Hansbrough | H04N 5/272 |

OTHER PUBLICATIONS

William Dilla et al., "Interactive Data Visualization: New Directions for Accounting Information Systems Research", Journal of Information Systems, vol. 24, No. 2, Sep. 1, 2010, pp. 1-37.

International Search Report and Written Opinion dated Jul. 10, 2017 for Application No. PCT/US2017/028509.

* cited by examiner

US 10,388,074 B2

GENERATING IMMERSIVE MEDIA VISUALIZATIONS FOR LARGE DATA SETS

BACKGROUND

Field

Embodiments presented herein generally relate to generating visualizations of large data sets, and more specifically to generating immersive media visualization of large data sets.

Description of the Related Art

In many applications, data sets may be analyzed to identify trends in these data sets, and the trends may be displayed to a user of the applications in various manners. For example, trends analyzed in these data sets may be displayed as textual data (e.g., in a report generated by an application) or in one or more graphs presented in conjunction with the data set. In other cases, applications may display large sets of numerical data, such as balance sheet data, cash flow analyses, profit/loss statements, and the like in a tabular format, such as a two-dimensional spreadsheet. These data sets may include one or more entries that a user may be interested in viewing (e.g., total assets or liabilities in a balance sheet data set, cash flow for a period of time, top line/bottom line numbers on a profit/loss statement, and so on); however, to view this data, a user may need to view the entire data set and identify a small number of entries in the data set that include the relevant data.

Further, to view and analyze subsets of data in the data set, a user may need to identify the relevant portion of a data set displayed in a tabular format before analyzing the data for the desired subset. After selecting the relevant portion of the data set, the user may perform further analyses of the data to obtain, for example, a profit/loss amount for a particular product line or division within an organization, a cash flow analysis for different geographical regions, or other analyses of datasets that are a subset of a large data set. These analyses of subsets of data, however, like the analyses of a large data set, may still be displayed in two-dimensional spreadsheets or other tabular formats, which, as discussed above, may include small amounts of relevant data interspersed within large amounts of data used to generate the relevant data.

SUMMARY

One embodiment of the present disclosure includes a method for generating an immersive media experience visualization of a data set. The method generally includes receiving, from a data source, a data set including a plurality of discrete data points summarizing data in the data set. A visualization engine generates an immersive media experience visualization of the data set. The immersive media experience visualization generally includes one or more objects corresponding to each of the plurality of discrete data points, and an appearance of each of the one or more objects is based, at least in part, on a comparison of a data point associated with an object and a baseline value associated with the data point. The visualization engine transmits the generated immersive media experience visualization of the data set to an immersive experience viewer for display.

Another embodiment provides a computer-readable storage medium having instructions, which, when executed on a processor, performs an operation for generating an immersive media experience visualization of a data set. The operation generally includes receiving, from a data source, a data set including a plurality of discrete data points summarizing data in the data set. A visualization engine generates an immersive media experience visualization of the data set. The immersive media experience visualization generally includes one or more objects corresponding to each of the plurality of discrete data points, and an appearance of each of the one or more objects is based, at least in part, on a comparison of a data point associated with an object and a baseline value associated with the data point. The visualization engine transmits the generated immersive media experience visualization of the data set to an immersive experience viewer for display.

Still another embodiment of the present invention includes a processor and a memory storing a program, which, when executed on the processor, performs an operation for generating an immersive media experience visualization of a data set. The operation generally includes receiving, from a data source, a data set including a plurality of discrete data points summarizing data in the data set. A visualization engine generates an immersive media experience visualization of the data set. The immersive media experience visualization generally includes one or more objects corresponding to each of the plurality of discrete data points, and an appearance of each of the one or more objects is based, at least in part, on a comparison of a data point associated with an object and a baseline value associated with the data point. The visualization engine transmits the generated immersive media experience visualization of the data set to an immersive experience viewer for display.

BRIEF DESCRIPTION OF THE DRAWINGS

So that the manner in which the above recited features of the present disclosure can be understood in detail, a more particular description of the disclosure, briefly summarized above, may be had by reference to embodiments, some of which are illustrated in the appended drawings. It is to be noted, however, that the appended drawings illustrate only exemplary embodiments and are therefore not to be considered limiting of its scope, may admit to other equally effective embodiments.

DETAILED DESCRIPTION

Immersive media platforms generally generate and display visualizations of data that a user can interact with. These visualizations may include, for example, environments displayed in gaming scenarios or other entertainment applications, training systems (e.g., for surgical training, where a user can interact with a digital model of a portion of the human body), and the like.

Immersive media generally includes virtual reality (VR), mixed reality (MR), augmented reality (AR), and other systems for displaying a virtual world or components of a virtual world to a user. In VR systems, a user may be isolated from the outside world (e.g., via a headset that covers a user's eyes and ears). A user of a VR system may be presented a virtual environment that replaces the physical environment surrounding the user. The portion of the virtual environment visible to the user may change based on the user's head movement. Objects presented in a visualization displayed in a VR system may exist virtually (e.g., as objects only in the virtual environment, but not in the real world), and users may interact with the presented objects (e.g., using one or more input peripherals, such as gamepads, handheld controllers, and the like).

Augmented reality and mixed reality systems generally allow the real world and a virtual world to coexist. In these systems, virtual components may be displayed to a user as an overlay to real-world objects. Virtual components in an augmented reality system may, for example, display information about a real-world object (e.g., arrival times for public transit, information about events occurring at a location a user is looking at, and the like) or display notifications to a user. However, users of an augmented reality system may not be able to manipulate virtual components displayed in the augmented reality system; further, the virtual components in an augmented reality system may not interact with the real world. In contrast, virtual components in a mixed reality system may be components that interact with the real world and user commands. For example, mixed reality systems can display components of a physical device that are under development, and users can manipulate either the virtual components or physical components to view the interaction between existing physical components and a component being designed.

Aspects of the present disclosure discuss the use of immersive media techniques as a visualization tool for large data sets, such as accounting data sets or large financial data sets. By transforming large data sets into visual components in an immersive world displayed by an immersive media device (e.g., a virtual reality, augmented reality, or mixed reality headset), visualization systems may allow users to view large data sets in a more rapidly comprehensible manner. Data sets may be represented by visual objects whose properties are modified by the underlying data sets used to generate the immersive world.

Figure 1:
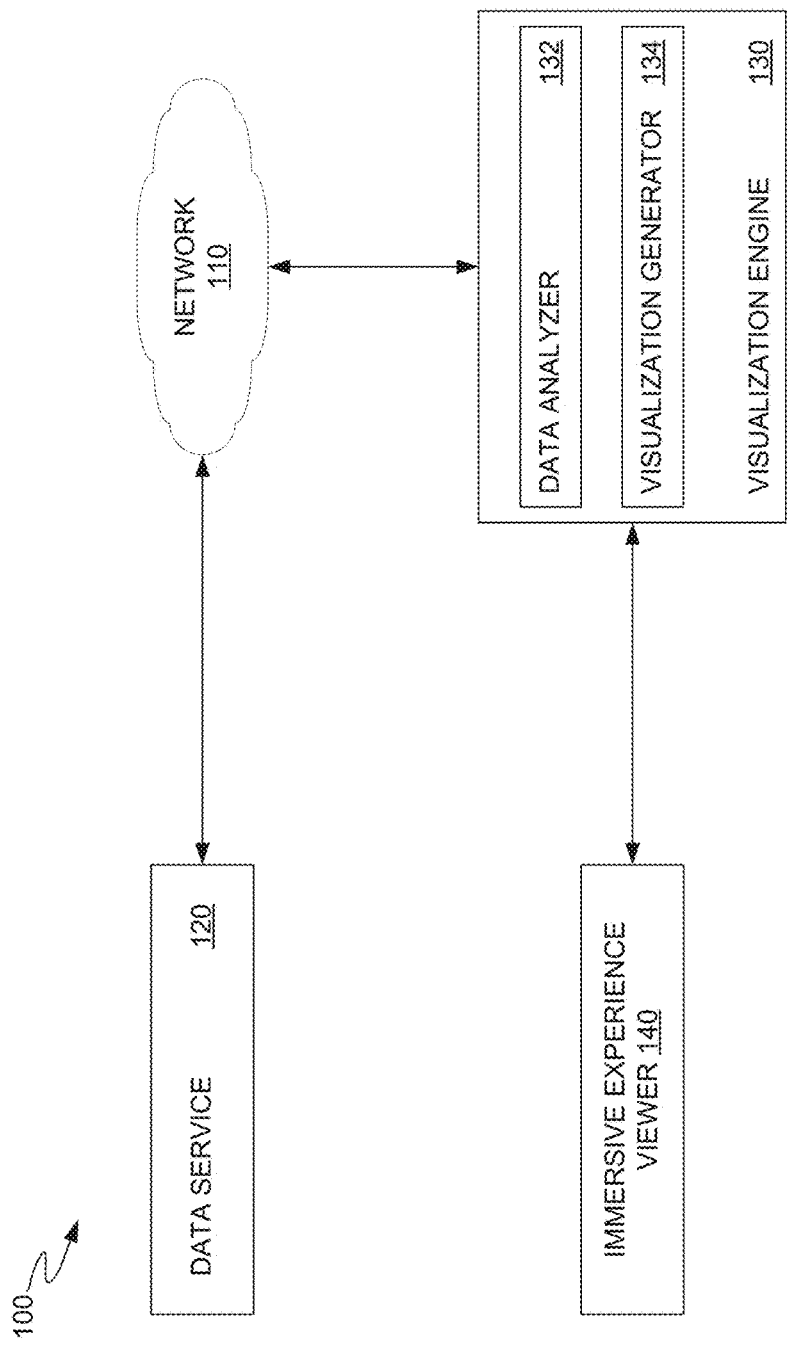
FIG. 1 illustrates an example networked computing environment, according to one embodiment.

FIG. 1 illustrates an example immersive media experience architecture, according to an embodiment. As illustrated, data source 120 and visualization engine 130 are connected via network 110. An immersive experience viewer 140 may be connected to visualization engine 130 (e.g., via a wired connection, such as a Universal Serial Bus (USB) connection, a fibre optic-based connection, or a wired, high bandwidth display connection (e.g. DisplayPort, HDMI, or the like), or via a wireless connection, such as Wi-Fi).

Data source 120 may be one or more applications executing on a local computer or in a distributed computing system that receives user input and processes the user inputs to generate data for export to visualization engine 130. For example, data source 120 may be a personal or business accounting program that receives transaction data as input. Data source 120 can use the received transaction data to generate a data set for output to visualization engine 130. The generated data set may include individual and aggregated transaction data. In some cases, the generated data set may include the transaction data input into data source 120 and an analysis of the data generated by data source 120, such as a profit/loss statement, a cash flow analysis, an assets/liabilities analysis, or the like.

Visualization engine 130 uses the generated data set from data source 120 to instantiate and render an immersive media experience (e.g., a virtual world that can be displayed to a user on immersive experience viewer 140) representing the data in the generated data set. As illustrated, visualization engine 130 includes a data analyzer 132 and a visualization generator 134.

Data analyzer 132 generally receives a data set from data source 120 and determines the properties of one or more objects to be displayed in an immersive media experience visualization of the data set, according to one embodiment. Data analyzer 132 may, for example, receive a data set for analysis from an accounting application. The data set may include summary data analyzing an overall data set (e.g., overall cash flow for a time period based on transactions in the data set, overall profit/loss for a time period based on cash inflows, cash outflows, and accrued payables and receivables, and the like) as well as data on a more granular level (e.g., data for sub-periods of the time period, data for different product lines or business units, and the like).

In some cases, data analyzer 132 generates an immersive media experience visualization of a data set as a plurality of connected segments. Each segment may represent, for example, a different aspect of the data set. Using the accounting data set discussed above as an example, different segments may represent different aspects of a business. A first segment may represent business profitability, a second segment may represent cash flow, a third segment may represent assets and liabilities, and so on. Within each segment, data analyzer 132 can generate one or more objects to represent an overall view of that segment and granular views of sub-components within a segment. In the accounting data set discussed above, sub-components may include, for example, product lines (e.g., profit/loss for different products or services sold by a company), business units, and so on.

In some cases, objects generated by data analyzer 132 may be defined with a baseline value and may change based on a difference between a baseline value and the data in the data set. Positive differences between the baseline value and a data point in the data set may be generated as larger objects in the immersive media experience visualization of the data set. For example, if an object is defined with a given height and width for zero profit or loss and the data point in the data set for which the object is generated indicates a profit, the object generated by data analyzer 132 may have a height and width greater than that of the baseline object. In contrast, if the data point in the data set for which the object is generated indicates a loss, the object may be generated by data analyzer 132 with a height and width less than that of the baseline object. In other cases, objects may be defined with a baseline size and features (e.g., foliage on a tree) that may change based on a comparison of the value of the data point represented by the object to the baseline value defined for the object. An object corresponding to a data point that indicates a profit in a profit/loss segment of the immersive media experience visualization of the data set may be generated as an object with additional features relative to the baseline object (e.g., additional foliage, flowers or fruit on a tree, and so on). In contrast, an object corresponding to a data point that indicates a loss in a profit/loss segment of the immersive media experience visualization of the data set may be generated as an object lacking some or all of the features of the baseline object (e.g., a tree lacking foliage, a tree with less vibrantly colored foliage relative to the baseline object (with brown leaves rather than green leaves), and so on).

In one example, as illustrated in further detail below, the objects generated by data analyzer 132 for rendering may be components in a virtual world of a forest. Different items of data in a received data set may be displayed in different segments of the forest. Segments with data that is considered positive (e.g., high positive cash flow or profitability) may be rendered as a plurality of trees with a large amount of foliage. In contrast, segments with data that is considered negative (e.g., high negative cash flow, accumulated losses, and the like) may be rendered in various manners. In one example, the segment may be rendered as a barren area. In another example, the segment may be rendered as a plurality of trees lacking foliage. Regardless of the specifics of how objects in the virtual forest are rendered, data analyzer 132 may generate objects for display in the virtual forest such that a user can clearly and quickly identify positive and negative data in the underlying data set from which the virtual forest was generated.

Data analyzer 132 may additionally be configured to analyze a data set to determine how well a user is meeting business or personal objectives or values. For example, data analyzer 132 can generate one or more scores representing a user's progress towards meeting the personal objectives or values, which may be defined on a per-user basis. The scores, in some cases, may be generated relative to a baseline value representing the user's objectives or values (e.g., as percentage progress towards meeting the user's objectives or values). Scores less than 100 percent of the user's objectives or values may cause data analyzer 132 to generate one or more rotary meters that are partially satisfied or filled, while scores greater than 100 percent of the user's objectives or values may cause data analyzer 132 to generate one or more rotary meters that are filled or exceeded. As discussed in further detail below, the rotary meters may be generated for display in the immersive media experience visualization of a data set in a predefined position in a virtual or augmented world.

Data analyzer 132 may additionally receive data about a hypothetical situation that data analyzer 132 uses to predict future values of the data set and update the immersive media experience visualization displayed to a user. Data analyzer 132 may receive this data, for example, via one or more voice commands captured by an assistant present in the virtual environment generated by visualization engine 130. In some cases, data analyzer 132 can perform an analysis of the hypothetical situation to generate a plurality of data sets from which data analyzer 132 can generate an immersive media experience visualization of the data set. The analysis may include, for example, a Monte Carlo analysis of the data used to identify a likely result of the hypothetical situation. Based on the identified likely result, data analyzer 132 can generate a data set representative of the hypothetical situation (e.g., by aggregating the generated data with a preexisting data set) and generate objects to be displayed in the immersive media experience visualization, as discussed above.

Visualization generator 134 generally receives the plurality of objects generated by data analyzer 132 for use in populating a visualization to be displayed to a user. In some cases, visualization generator 134 may use a base template to generate an immersive media experience visualization of the data set analyzed by data analyzer 132. Visualization generator 134 may segment the base template according to a segmentation indicated by data analyzer 132. For each segment, visualization generator 134 may insert an object generated by data analyzer 132. In some cases, visualization generator 134 may additionally attach an event handler to each object, which may allow visualization generator 134 to display informational panels to a user when a user selects an object in the immersive media experience visualization of the data set. These informational panels may be used, for example, to display the data used to generate an object in the immersive media experience visualization of the data set. In some cases, the informational panels may display summary data for the object, more granular data points for the object (e.g., profit/loss for a period of time small than that used to generate the object), trend graphs illustrating trends in the underlying data used to generate the object, and so on.

In some cases, the template used to generate the immersive media experience visualization of a data set may include predefined positions at which various panels and other data may be displayed to a user. For example, dashboard panels in which a user may view summary data for a particular segment in the immersive media experience visualization of the data set may be positioned to be viewable if a user's perspective changes from a straight-ahead perspective to a perspective where the user is looking downwards towards a point below a horizon. Visualization generator 134 may populate the dashboard panels with data from the data set used to generate the immersive media experience visualization displayed to a user. Using the accounting data set example discussed above, the dashboard panels may be generated to display to a user a summary of the numerical data used to generate a particular segment of the immersive media experience visualization.

The template may, in some cases, identify data to be displayed if a user looks at a point that is 90 degrees below the horizon. For example, one or more rotary meters may be displayed to a user if the user's perspective moves to a perspective where the user is looking directly downwards. These meters may be generated from an analysis of an underlying data set, as discussed above, and provide at-a-glance information about the health of a business or personal finances, progress towards goals, how well a business or user is meeting objectives (e.g., profitability, values that are important to the user, or the like), and so on. In some cases, the rotary meters may change when a user requests a simulation of a hypothetical situation so that the user can look downwards and see the changes to the one or more rotary meters that resulted from the hypothetical situation.

While the immersive media experience visualization generated by visualization engine 130 is described in the scope of a forest environment, it should be recognized that the visualization may be generated as any sort of virtual or augmented world.

Immersive experience viewer 140 generally allows a user to view a virtual world or virtual overlays that merge virtual components with a user's perspective of the real world. Immersive experience viewer 140 may include, for example, virtual reality (VR) headsets that render a virtual world and block the user from seeing the real world, augmented reality (AR) headsets or mixed reality (MR) headsets that merge virtual objects into a user's perspective of the real world, and the like. As the user's head moves around, immersive experience viewer 140 may display different portions of the virtual world or different virtual objects overlaid in the user's perspective of the real world. For example, if the user's head rotates about the horizontal axis, immersive experience viewer 140 may display a visualization of different parts of a data set. If the user's head rotates about the vertical axis, immersive experience viewer 140 may, in some cases, display informational dashboards, meters, and the like.

In some cases, immersive experience viewer 140 may additionally include one or more input devices that a user can use to interact with the virtual world or virtual objects generated by visualization engine 130. These input devices may include, for example, control pads, microphones for obtaining voice commands from a user, and the like. In some cases, as discussed above, the input devices of immersive experience viewer may allow a user to select one or more objects generated by visualization engine 130 to obtain additional data about that object. For example, a user may be able to select an object representing a particular product line from the visualization of a virtual world generated from a financial data set. In response, as discussed above, visualization engine 130 may display, in immersive experience viewer 140, one or more informational panels that include the data used to generate the selected object (e.g., profit/loss data for a particular product line or business unit, transaction histories for that product line or business unit, and the like). In other cases, the input devices may allow a user to invoke an assistant in the virtual world to perform one or more functions with respect to the virtual environment or virtual objects. In still further cases, the input devices may allow a user to provide hypothetical situation data to visualization engine 130 for analysis and display as a new immersive multimedia experience visualization. In some cases, inputs may allow a user to switch between an immersive multimedia experience visualization of a base data set and an immersive multimedia experience visualization of a data set representing the hypothetical scenario.

Figure 2:
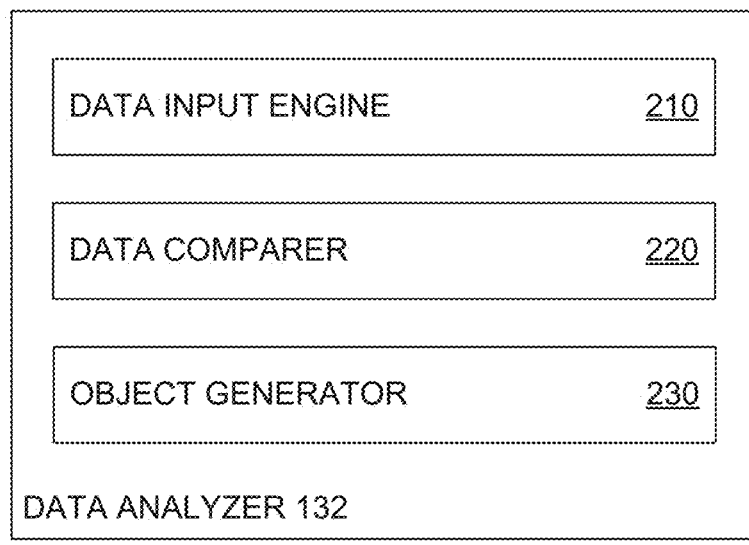
FIG. 2 illustrates an example data analyzer of a visualization engine that uses data sets exported from a data source to generate an immersive media experience visualization for display to a user, according to one embodiment.

FIG. 2 illustrates an example data analyzer 132 of a visualization engine 130, according to one embodiment. As illustrated, data analyzer 132 generally includes a data input engine 210, data comparer 220, and an object generator 230.

Data input engine 210 generally obtains a data set from data source 120 and/or a user (e.g., for visualization of hypothetical scenarios). Data input engine 210 parses the received data set to identify summary data points that may be used to generate one or more objects in an immersive media experience visualization of the data set, as well as the underlying, more granular data that may be used to populate dashboards, informational panes, and the like. Data input engine 210 may pass the summary data to data comparer for analysis, as discussed in further detail below.

Further, in some cases, data input engine 210 can obtain information defining a hypothetical scenario for which a user wishes to visualize. To generate a data set for the hypothetical scenario, data input engine 210 may analyze the obtained information to generate one or more additional data points to insert into the data set and update one or more summary data points to reflect the hypothetical scenario. For example, if a user requests a visualization of a hypothetical business merger that adds one or more product lines to a business's offerings, the hypothetical data may use information provided by the user of the current profit or loss generated by the one or more additional product lines, growth analysis or projections, and the like to generate a new data set for use in generating the visualization of the hypothetical scenario. As discussed above, in some cases, data input engine 210 may perform an analysis of inputs provided for the hypothetical scenario (e.g., a Monte Carlo analysis) to determine a range of possible outcomes of the hypothetical scenario. In some cases, data input engine 210 aggregates the analysis into a single data point (e.g., an average projected additional profit/loss generated by the additional product lines in the merger example discussed above) to add into a previously-obtained data set (e.g., an accounting data set representing the current state of a business's finances).

Data comparer 220 is generally configured to compare data points in an obtained data set against baseline data associated with one or more objects to be generated and displayed in the immersive media experience visualization of a data set, according to an embodiment. As discussed above, if data comparer 220 generates a result indicating a positive difference of a data point relative to a defined baseline for the data point, data comparer 220 can generate one or more indicators of a degree of positive difference for use in generating an object for display in the visualization (e.g., a tree displayed in a segment of the visualization). In contrast, if data comparer 220 generates a result indicating a negative difference of a data point relative to the defined baseline, data comparer 220 can generate one or more indicators of a degree of negative difference for use in generating an object for display in the visualization.

In some cases, data comparer 220 may further analyze data in a received data set to determine an amount of progress in satisfying a user's business objectives or values, as discussed above. For each of the user's defined business objectives or values, data comparer 220 may generate one or more scores representing a user's progress towards meeting that objective or value. The scores, in some cases, may be generated relative to a baseline value representing the user's objectives or values (e.g., as percentage progress towards meeting the user's objectives or values). Scores less than 100 percent of the user's objectives or values may indicate that the user has not met the defined objectives or values, while scores greater than 100 percent of the user's objectives or values may indicate that the user has met or exceeded the defined objectives or values.

Object generator 230 generally uses input from data comparer 220 to generate objects to be inserted and displayed in the immersive media experience visualization of a data set, according to an embodiment. As discussed above, object generator 230 may, in some cases, receive data from data comparer 220 indicating a deviation from a baseline value for a specific data point that generally indicates the manner in which the object corresponding to the data point is to be rendered. For example, positive deviations reported by data comparer 220 may indicate that the object corresponding to the data point is to be generated with size properties that exceed the size properties corresponding to an object generated for the baseline value, while negative deviations reported by data comparer 220 may indicate that the object corresponding to the data point is to be generated with size properties that are less than the size properties corresponding to the object generated for the baseline value. In another example, positive deviations reported by data comparer 220 may indicate that the object corresponding to the data point is to be generated with brighter colors than an object generated for the baseline value, while negative deviations reported by data comparer 220 may indicate that the object corresponding to the data point is to be generated with duller colors than the object generated for the baseline value.

After object generator 230 generates an object based on deviations from a baseline value, object generator 230 may provide the object to visualization generator 134 with an indication of a location in the immersive media experience visualization of the data set in which the object is to be placed. As discussed above, in cases where visualization generator 134 uses a predefined template to generate the immersive media experience visualization, object generator 230 can identify a portion of the template in which the object is to be displayed. In some cases, object generator 230 may provide the coordinates in a virtual environment in which a generated object is to be displayed.

Figure 3:
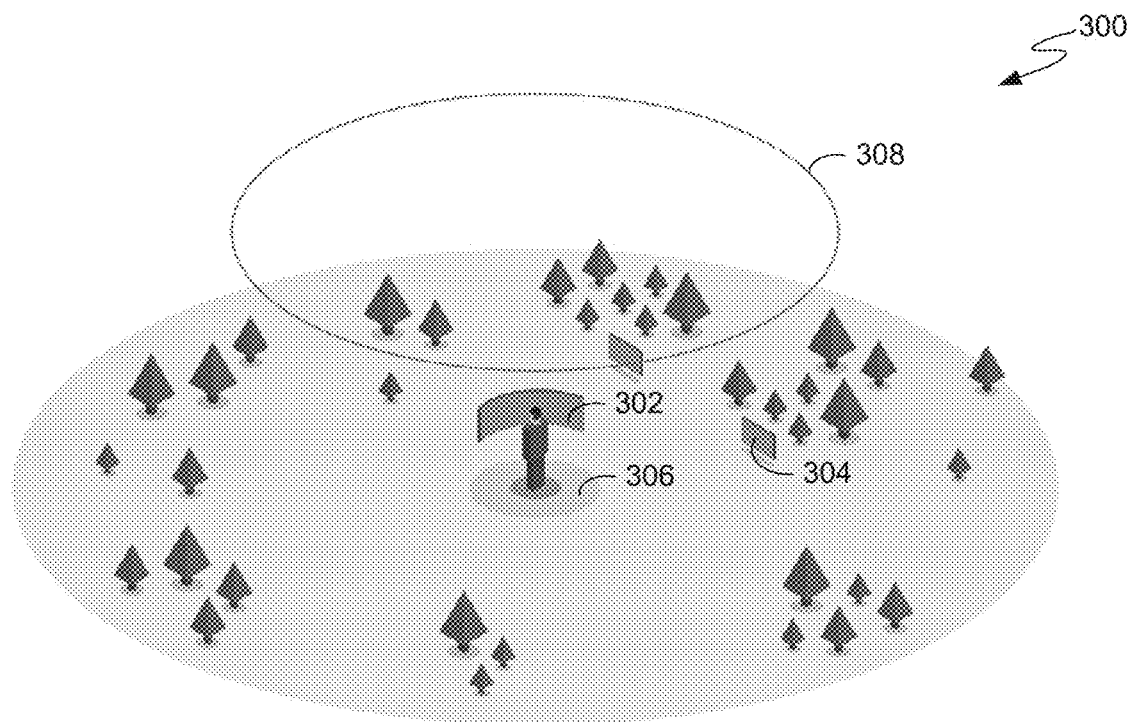
FIG. 3 illustrates an example immersive media experience visualization of a data set, according to one embodiment.

FIG. 3 illustrates an example immersive media experience visualization 300 of a data set, according to an embodiment. As illustrated, the immersive media experience visualization 300 may be a visualization of a forest. The forest may be segmented in to a plurality of segments. As discussed above, each segment may represent a different aspect of the data set used to generate the visualization (e.g., a profitability segment, a cash flow segment, an assets/liabilities analysis segment, and the like). Immersive visualization 300 generally includes a plurality of trees in each segment, with the size of each tree representing a comparison between a baseline value for the segment and the data in the data set used to generate the tree. Immersive visualization 300 additionally includes a plurality of dashboards 302, a plurality of informational panes 304, a values/objectives circle 306, and a virtual assistant 308 displayed in the virtual or augmented world.

Figure 4:
FIG. 4 illustrates an example dashboard in an immersive media experience visualization of a data set, according to one embodiment.

FIG. 4 illustrates an example dashboard 302 displayed in immersive media experience visualization 300 of a data set, according to an embodiment. As illustrated, dashboard 304 includes various visual data points describing the data represented by a segment of the immersive media experience visualization 300 of the data set. In some cases, each segment in the immersive media experience visualization may be associated with a dashboard that summarizes the data used to generate objects in the immersive media experience visualization. These dashboards may display data in alternative graphical formats, such as pie charts, line charts, and the like. For example, a dashboard 302 corresponding to a profitability segment of an immersive media experience visualization 300 may illustrate changes in profitability over time, percentage of profits derived from different product lines or business units, and the like. In another example, a dashboard 302 corresponding to an expenditures segment of the immersive media experience visualization may illustrate a pie chart segmenting expenditures by type (e.g., marketing, wages and benefits, facilities, operations, material inputs, and so on). In some cases, dashboard 302 may be displayed in an area below a horizon of a virtual or augmented environment such that dashboard 302 is visible to a user if the user looks at a point below the horizon.

Figure 5:
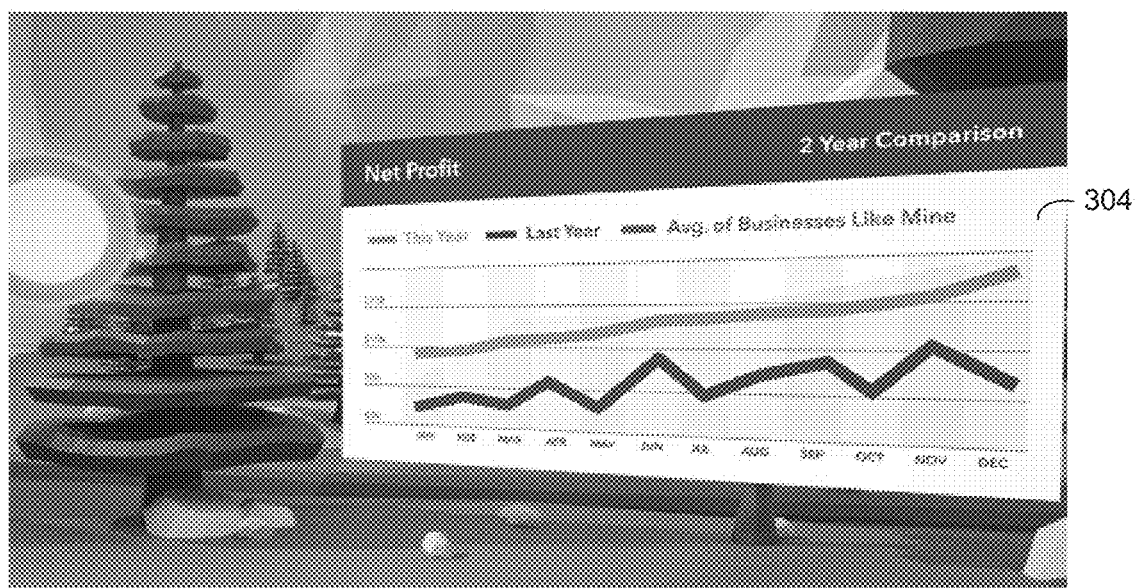
FIG. 5 illustrates an example information panel in an immersive media experience visualization of a data set, according to one embodiment.

FIG. 5 illustrates an example informational pane 304 displayed in immersive media experience visualization 300 of a data set, according to an embodiment. In some cases, informational pane 304 may be displayed to a user when a user views a tree in the forest visualization illustrated in immersive media experience visualization 300. In other cases, informational pane 304 may be invisible to a user until a user affirmative selects a particular tree in the immersive media experience visualization 300 of a data set. As illustrated, informational pane 304 may display at least some of the underlying data used in generating the tree representing the data point. For example, if a user has selected a tree representing overall profitability in immersive media experience visualization 300 of an accounting data set, informational pane 304 may display more granular profitability data, such as profitability for different business units or product lines. In another example, if a user has selected a tree representing profitability of a particular product line, informational pane 304 may display information such as transactional data for the selected product line, trend graphs illustrating historical trends in revenue and expenditures for the selected product line, and the like.

Figure 6:
FIG. 6 illustrates an example values meter in an immersive media experience visualization of a data set, according to one embodiment.

FIG. 6 illustrates an example values/objectives circle 306 displayed in immersive media experience visualization 300 of a data set, according to an embodiment. The values/objectives circle 306 may include a plurality of rotary meters corresponding to each of the objectives or values defined by the user. These rotary meters may measure a user or organization's progress towards meeting the defined objectives. As discussed above, the values/objectives circle 306 may display progress towards meeting defined objectives or values as scores relative to a baseline value representing the user's objectives or values (e.g., as percentage progress towards meeting the user's objectives or values). Scores less than 100 percent of the user's objectives or values may cause one or more rotary meters to be partially satisfied or filled, while scores greater than 100 percent of the user's objectives or values may cause one or more rotary meters that to be filled or exceeded.

Figure 7:
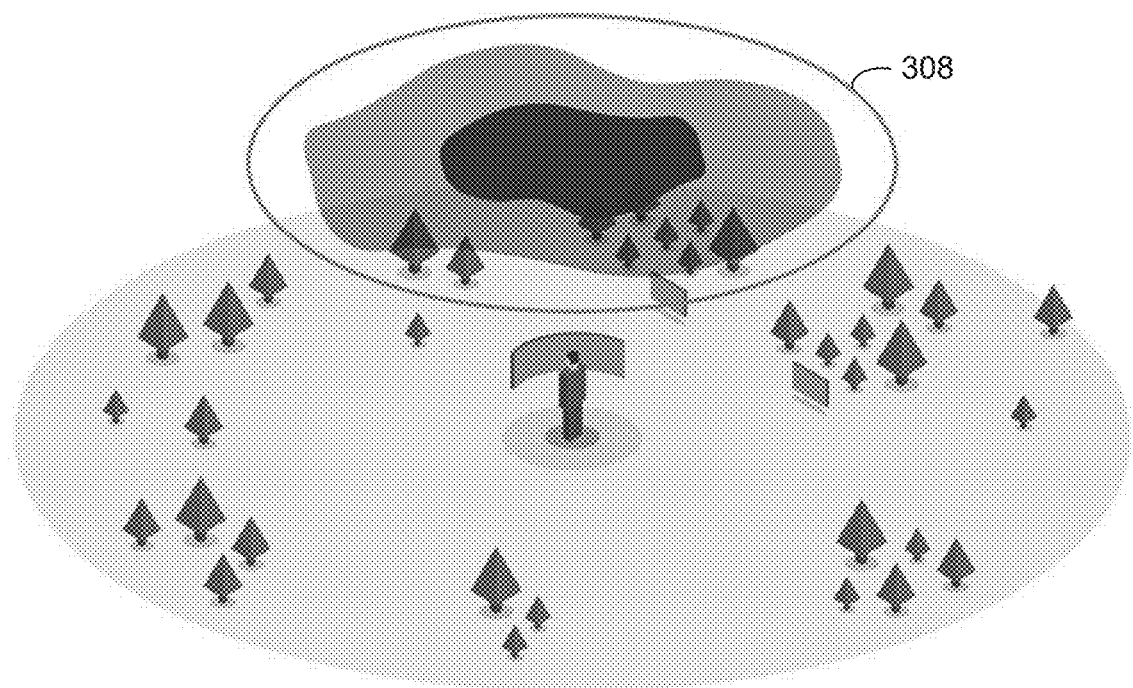
FIG. 7 illustrates an example assistant in an immersive media experience visualization of a data set, according to one embodiment.

FIG. 7 illustrates an example virtual assistant 308 displayed in immersive media experience visualization 300 of a data set, according to an embodiment. Virtual assistant 308, as illustrated, may be positioned as a selectable object in a different plane of the immersive media experience visualization 300 (e.g., above the horizon in the immersive media experience visualization 300). In some cases, a user invokes virtual assistant 308 by selecting the virtual assistant 308 using one or more input devices connected to immersive experience viewer 140. In some cases, virtual assistant 308 processes vocal commands obtained via one or more microphones that are connected to or a part of immersive experience viewer 140. Virtual assistant 308 may, for example, reorient the perspective displayed in immersive experience viewer 140 based on voice commands or other inputs indicating a direction in which the displayed perspective should be moved. In another example, virtual assistant 308 displays one or more informational panes 304 in response to user requests to display informational panes 304 for one or more objects displayed in the immersive media experience visualization 300. In still further examples, virtual assistant 308 may be used to invoke one or more functions for simulating the effect of hypothetical events on a data set used to generate immersive media experience visualization 300.

Figure 8:
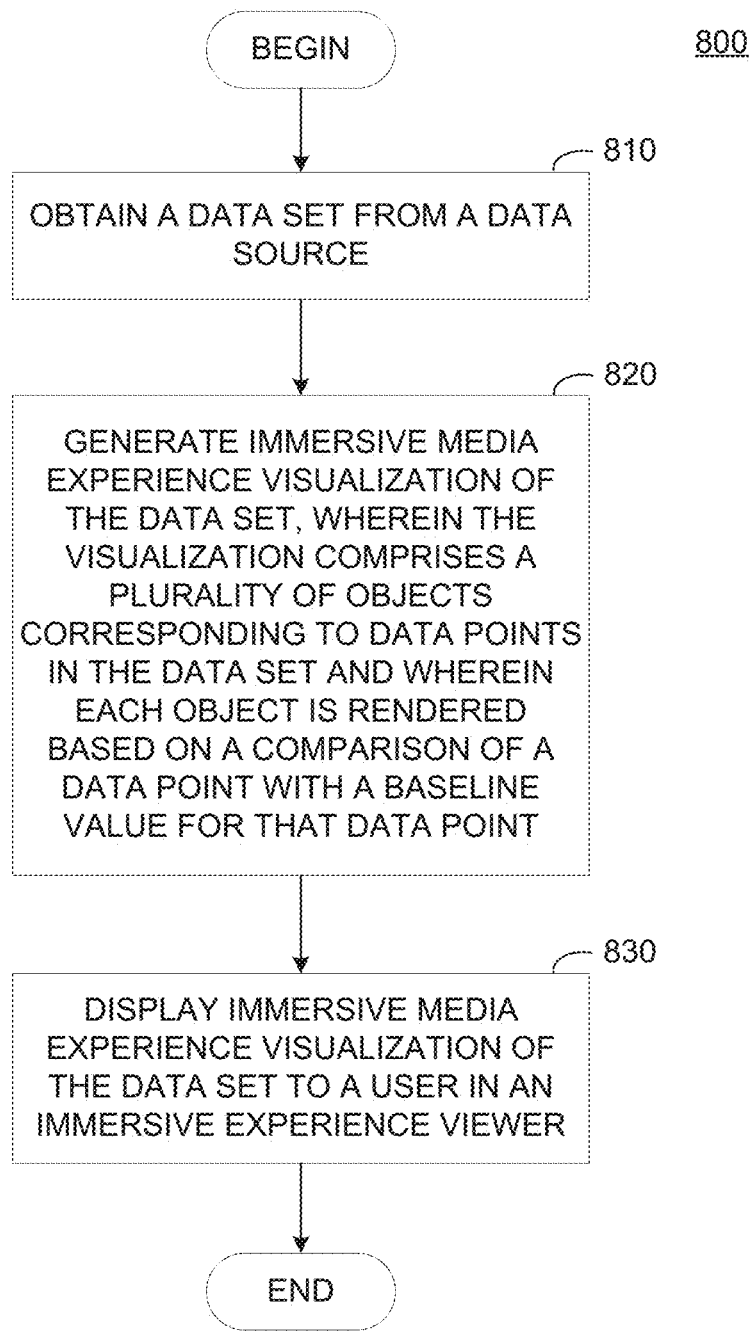
FIG. 8 illustrates example operations that may be performed by a visualization generator to generate an immersive media experience visualization of a data set, according to one embodiment.

FIG. 8 illustrates example operations that may be performed by visualization engine 130 to generate an immersive media experience visualization of a data set, according to an embodiment. As illustrated, operations 800 begin at step 810, where visualization engine 130 obtains a data set from a data source. The data set may, as discussed above, include one or more data points from which elements in an immersive media experience visualization of the data set may be generated. In some cases, the data set may include a plurality of summary data points that can be used to populate one or more dashboards in the visualization and a plurality of more granular data points that can be used, for example, to generate one or more objects in the visualization (e.g., trees in a forest visualization of the data set).

At step 820, the visualization engine generates an immersive media experience visualization of the data set. As discussed above, the visualization generally comprises a plurality of objects corresponding to data points in the data set. Some objects in the immersive media experience visualization of the data set may be generated with properties determined relative to a baseline object defined for a neutral representation of a data point. For example, trees in a forest generated as the immersive media experience visualization of the data set may be defined with a baseline size and properties (e.g., color, amount of foliage, and so on) for a data point corresponding to no profit or loss. If a data point used to generate a tree in the forest indicates that a profit has been made for a particular time period, product line, business unit, or the like, the generated tree may be larger and have more vibrant foliage (e.g., brighter colored foliage) than the baseline tree. In contrast, if the data point used to generate the tree indicates that a loss has been made for a particular time period, product line, business unit, or the like, the generated tree may be smaller and/or have less vibrant foliage (e.g., darker colored or discolored foliage) than the baseline tree. In another example, values/objectives circles may be displayed as progress towards meeting the user's objectives or values.

Other objects, such as dashboard components and informational panes, may include graphs, charts, tables, and other visualizations generated using data points included in the data set. Dashboard components, as discussed above, may be displayed, in some cases, at a point below a horizon in the immersive media experience visualization. In some cases, the dashboard components may be generated on a per-segment basis in the visualization such that the dashboard displayed for a specific segment of the visualization displays relevant data for that segment (e.g., line charts showing profitability trends in a profit/loss segment of the visualization; pie charts showing expenditures on a per-business-unit basis in an expenditures segment of the visualization, and the like). The informational panes generated by visualization engine 130 may be generated as hidden objects that are displayed to a user when a user selects the corresponding object in the visualization (e.g., via button inputs or voice inputs processed by virtual assistant 308).

At step 830, visualization engine 130 displays the immersive media experience visualization to a user on an immersive experience viewer. In some cases, visualization engine 130 displays the immersive media experience visualization as a virtual world on a virtual reality headset. In other cases, visualization engine 130 displays the immersive media experience visualization as a translucent or holographic overlay on the user's perspective of the real world.

Figure 9:
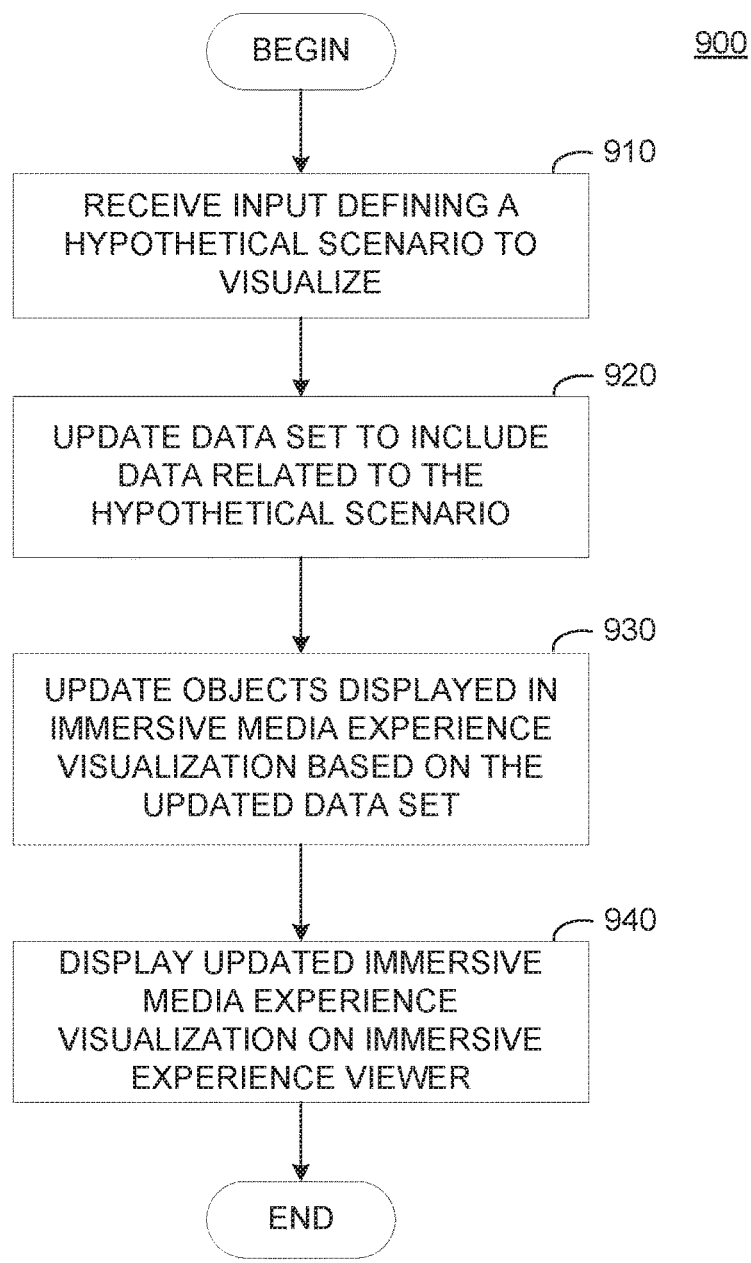
FIG. 9 illustrates example operations that may be performed by a visualization generator to update an immersive media experience visualization of a data set based on a simulation of a hypothetical scenario, according to one embodiment.

FIG. 9 illustrates example operations that may be performed by visualization engine 130 to generate an immersive media experience visualization of a data set in a user-defined hypothetical scenario, according to an embodiment. As illustrated, operations 900 begin at step 910, where visualization engine 130 receives input from a user defining a hypothetical scenario to visualize. The input defining the hypothetical scenario may include, for example, expected expenditures and revenues for the hypothetical scenario.

At step 920, visualization engine 130 updates the data set to include data related to the hypothetical scenario. In some cases, visualization engine 130 performs a probabilistic analysis of the input defining the hypothetical scenario (e.g., a Monte Carlo simulation) to identify a most likely result of undertaking the tasks represented by the hypothetical scenario. In some cases, to update a data set, visualization engine 130 adds one or more data points representing, for example, estimated profit/loss entailed in undertaking the hypothetical scenario, estimated cash flow entailed in undertaking the hypothetical scenario, and the like. Additionally, visualization engine 130 may update data points in the data set used in determining a user's progress towards meeting user-defined values and business objectives.

At step 930, visualization engine 130 updates objects displayed in the visualization based on the updated data set. To update objects displayed in a visualization, visualization engine 130 may update the object corresponding to a data point (e.g., a tree representing profit/loss for a specific product line or a business unit) based on the new data corresponding to that data point. In some cases, visualization engine 130 determines a size and properties of the object relative to the baseline object based on the updated data set and update the object definition with a value representing the updated deviation from the baseline value. For example, if the hypothetical scenario results in an increased positive deviation from the baseline value (e.g., an increase in generated profits), visualization engine 130 may update the tree representing profit/loss in a forest visualization to increase the size and foliage vibrance of the tree. Correspondingly, if the hypothetical scenario results in an increased negative deviation from the baseline value (e.g., an increase in generated losses), visualization engine 130 may update a tree representing profit/loss in the forest visualization to decrease the size and foliage vibrance of the tree.

At step 940, visualization engine 130 displays the updated visualization on the immersive experience viewer. As discussed above, the updated visualization may be displayed as a virtual world on a virtual reality headset or as an overlay to a user's perspective of the real world in an augmented reality or mixed reality headset.

Figure 10:
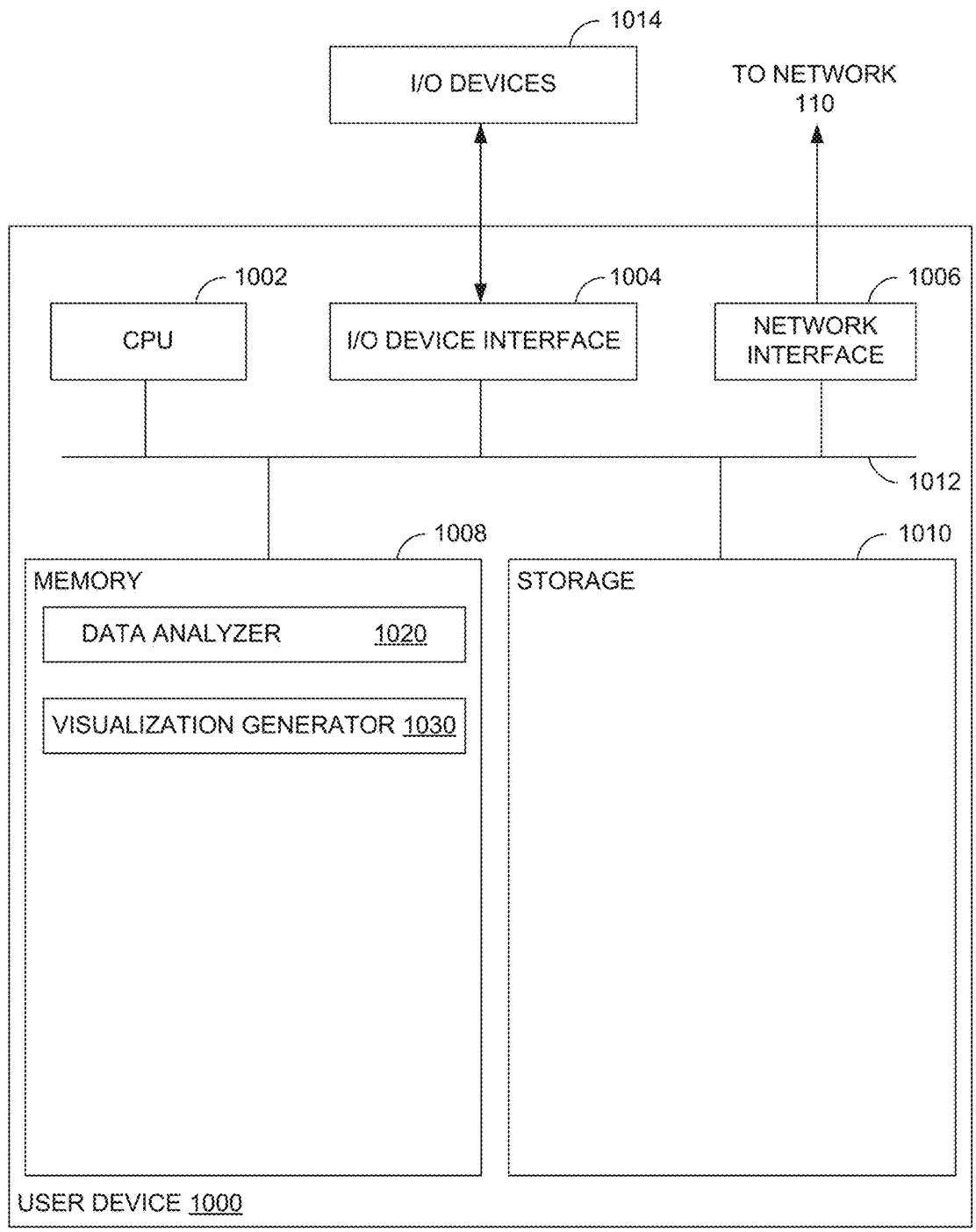
FIG. 10 illustrates an example system for generating an immersive media experience visualization of a data set, according to one embodiment.

FIG. 10 illustrates a system 1000 that generates immersive media visualizations of a data set, according to an embodiment. As shown, the system 1000 includes, without limitation, a central processing unit (CPU) 1002, one or more I/O device interfaces 1004 which may allow for the connection of various I/O devices 1014 (e.g., keyboards, displays, mouse devices, pen input, etc.) to the system 1000, network interface 1006, a memory 1008, storage 1010, and an interconnect 1012.

CPU 1002 may retrieve and execute programming instructions stored in the memory 1008. Similarly, the CPU 1002 may retrieve and store application data residing in the memory 1008. The interconnect 1012 transmits programming instructions and application data, among the CPU 1002, I/O device interface 1004, network interface 1006, memory 1008, and storage 1010. CPU 1002 is included to be representative of a single CPU, multiple CPUs, a single CPU having multiple processing cores, and the like. Additionally, the memory 1008 is included to be representative of a random access memory. Furthermore, the storage 1010 may be a disk drive, solid state drive, or a collection of storage devices distributed across multiple storage systems. Although shown as a single unit, the storage 1010 may be a combination of fixed and/or removable storage devices, such as fixed disc drives, removable memory cards or optical storage, network attached storage (NAS), or a storage area-network (SAN).

As shown, memory 1008 includes a data analyzer 1020 and a visualization generator 1030. Data analyzer 1020 is generally configured to receive user input of a data set (e.g., from a data service 120) and use data in the data set to generate one or more objects to be displayed in an immersive media experience visualization of the data set. As discussed above, some objects generated by data analyzer 1020 may be generated based on a difference between a baseline value defined for the object and the value of a data point in the data set. Other objects generated by data analyzer 1020 may be generated for display below a horizon view in the immersive media experience visualization of the data set, such as informational dashboards and a values/objectives meter.

In some cases, data analyzer 1020 may further receive data from a user identifying a hypothetical scenario for which an immersive media experience visualization is to be generated. The hypothetical scenario may include, for example, expected expenditures and results generated by the hypothetical scenario. Data analyzer 1020 may perform a probabilistic analysis (e.g., a Monte Carlo simulation) of the hypothetical scenario to determine a likely result of the hypothetical scenario. As discussed above, based on the determined likely result of the hypothetical scenario and an existing data set, data analyzer 1020 can update an existing visualization to show how the hypothetical scenario would, for example, impact a business or user's personal financial situation.

Visualization generator 1030 generally uses the objects generated by data analyzer 1020 to generate a visualization for display to a user via immersive experience viewer 140. As discussed above, visualization generator 1030 may, in some cases, use a base template to generate an immersive media experience visualization of the data set analyzed by data analyzer 1020. Visualization generator 1030 may segment the base template, and for each segment, visualization generator 1030 may insert an object generated by data analyzer 1020. In some cases, visualization generator 1030 may additionally attach an event handler to each object, which may allow visualization generator 1030 to display informational panels to a user when a user selects an object in the immersive media experience visualization of the data set. These informational panels may be used, for example, to display the data used to generate an object in the immersive media experience visualization of the data set. In some cases, the informational panels may display summary data for the object, more granular data points for the object (e.g., profit/loss for a period of time small than that used to generate the object), trend graphs illustrating trends in the underlying data used to generate the object, and so on. Visualization generator 1030 is also configured to display static data, such as informational panels, dashboards, a virtual assistant, and the like in the immersive media experience visualization of the data set, as discussed above.

Advantageously, by generating immersive media experience visualizations of large data sets, a system can generate a visualization of a data set that allows a user to quickly and easily view information about the large data set. Data of interest to a user may be represented graphically in a manner that indicates whether the data represents a positive value or trend (e.g., generating profits or increasing profits generated by a business) or a negative value or trend (e.g., generating losses or increasing losses generated by a business). The user need not examine a spreadsheet or table with large amounts of data in order to find the small number of data points of interest. Further, an immersive media experience visualization may allow for the display of data analyses for hypothetical scenarios in the same manner such that a user can quickly and easily see the impact of a scenario on the underlying data set.

Note, descriptions of embodiments of the present disclosure are presented above for purposes of illustration, but embodiments of the present disclosure are not intended to be limited to any of the disclosed embodiments. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

In the preceding, reference is made to embodiments presented in this disclosure. However, the scope of the present disclosure is not limited to specific described embodiments. Instead, any combination of the preceding features and elements, whether related to different embodiments or not, is contemplated to implement and practice contemplated embodiments. Furthermore, although embodiments disclosed herein may achieve advantages over other possible solutions or over the prior art, whether or not a particular advantage is achieved by a given embodiment is not limiting of the scope of the present disclosure. Thus, the aspects, features, embodiments and advantages discussed herein are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

Aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples a computer readable storage medium include: an electrical connection having one or more wires, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the current context, a computer readable storage medium may be any tangible medium that can contain, or store a program.

While the foregoing is directed to embodiments of the present disclosure, other and further embodiments of the disclosure may be devised without departing from the basic scope thereof, and the scope thereof is determined by the claims that follow.

What is claimed is:

1. A method, comprising:
   receiving, from a data source, a data set including a summary data point for the data set and a plurality of granular data points associated with the summary data point;
   calculating a first difference value between the summary data point and a baseline value for the summary data point;
   calculating a plurality of second difference values between each granular data point and a baseline value for each granular data point;
   determining visual objects to display in a graphical user interface of an immersive media experience visualization based on the first difference value, wherein:
      the visual objects are segmented into a plurality of groups of visual objects, and
      each group of the plurality of groups of visual objects corresponds to one of the plurality of granular data points;
   determining visual attributes for visual objects in each respective group of visual objects of the plurality of groups of visual objects based on a respective second difference value calculated for a respective granular data point corresponding to the respective group of visual objects, wherein:
      the visual objects in the respective group of visual objects have a greater number of visual features relative to a baseline version of the respective visual object, wherein a value of the respective granular data point is greater than a baseline value, or
      the visual objects in the respective group of visual objects have a smaller number of visual features relative to the baseline version of the respective visual object, wherein the value of the respective granular data point is less than the baseline value;
   generating a first immersive media experience visualization of the data set including the determined visual objects having the determined visual attributes; and
   transmitting the generated first immersive media experience visualization of the data set to an immersive experience viewer for display in a graphical user interface of the immersive experience viewer.

2. The method of claim 1, wherein the first immersive media experience visualization further comprises a dashboard summarizing one or more portions of the data set, a plurality of information panes associated with the groups of visual objets, a values progress meter, and a virtual assistant.

3. The method of claim 2, wherein the dashboard is generated at a position below a midpoint defined for the first immersive media experience visualization of the data set.

4. The method of claim 2, wherein each of the plurality of information panes is visible upon user selection of an object associated with a specific information pane.

5. The method of claim 2, wherein the values progress meter is generated at a position perpendicular to a midpoint defined for the first immersive media experience visualization of the data set.

6. The method of claim 2, wherein the virtual assistant is configured to receive user input for interacting with the first immersive media experience visualization of the data set.

7. The method of claim 1, further comprising:
   receiving, from a user, data defining a hypothetical scenario;
   updating the data set based on the data defining the hypothetical scenario;
   generating a second immersive media experience visualization of the updated data set; and
   transmitting the generated second immersive media experience visualization of the data set to the immersive experience viewer for display.

8. The method of claim 7, further comprising:
   receiving an indication of a desired visualization to display in the immersive experience viewer, wherein the indication indicates one of the first immersive media experience visualization or the second immersive media experience visualization; and
   transmitting the desired visualization to the immersive experience viewer for display.

9. The method of claim 1, wherein the first immersive media experience visualization comprises a forest representing the data set, and wherein the visual objects comprise one or more trees in the forest.

10. The method of claim 9, wherein:
    the visual features comprise foliage on the trees,
    the greater number of visual features relative to the baseline version of the respective visual object comprises a larger amount of foliage on the trees relative to a baseline version of the trees, and
    the smaller number of visual features relative to the baseline version of the respective visual object comprises a smaller amount of foliage on the trees relative to the baseline version of the trees.

11. A system, comprising:
    a processor; and
    a memory storing instructions which, when executed by the processor, performs an operation for generating an immersive media experience visualization of a data set, the operation comprising:
       receiving, from a data source, a data set including a summary data point for the data set and a plurality of granular data points associated with the summary data point;
       calculating a first difference value between the summary data point and a baseline value for the summary data point;
       calculating a plurality of second difference values between each granular data point and a baseline value for each granular data point;
       determining visual objects to display in a graphical user interface of an immersive media experience visualization based on the first difference value, wherein:
          the visual objects are segmented into a plurality of groups of visual objects, and
          each group of the plurality of groups of visual objects corresponds to one of the plurality of granular data points;
       determining visual attributes for visual objects in each respective group of visual objects of the plurality of groups of visual objects based on the second difference value calculated for a respective granular data point corresponding to the respective group of visual objects, wherein:
          the visual objects in the respective group of visual objects have a greater number of visual features relative to a baseline version of the respective visual object, wherein a value of the respective granular data point exceeds a baseline value, or
          the visual objects in the respective group of visual objects have a smaller number of visual features relative to the baseline version of the respective visual object wherein the value of the respective granular data point is less than the baseline value;

generating a first immersive media experience visualization of the data set including the determined visual objects having the determined visual attributes; and transmitting the generated first immersive media experience visualization of the data set to an immersive experience viewer for display in a graphical user interface of the immersive experience viewer.

12. The system of claim 11, wherein the first immersive media experience visualization further comprises a dashboard summarizing one or more portions of the data set, a plurality of information panes associated with the one or more objects, a values progress meter, and a virtual assistant.

13. The system of claim 11, wherein the operation further comprises:
receiving, from a user, data defining a hypothetical scenario;
updating the data source based on the data defining the hypothetical scenario;
generating a second immersive media experience visualization of the updated data set; and
transmitting the generated second immersive media experience visualization of the data set to the immersive experience viewer for display.

14. The system of claim 11, wherein the first immersive media experience visualization comprises a forest representing the data set, and wherein the one or more objects comprise one or more trees in the forest.

15. The system of claim 14, wherein:
the visual features comprise foliage on the trees,
the greater number of visual features relative to the baseline version of the respective visual object comprises a larger amount of foliage on the trees relative to a baseline version of the trees, and
the smaller number of visual features relative to the baseline version of the respective visual object comprises a smaller amount of foliage on the trees relative to the baseline version of the trees.

16. A non-transitory computer-readable medium storing instructions which, when executed by a processor, performs an operation for generating an immersive media experience visualization of a data set, the operation comprising:
receiving, from a data source, a data set including a summary data point for the data set and a plurality of granular data points associated with the summary data point;
calculating a first difference value between the summary data point and a baseline value for the summary data point;
calculating a plurality of second difference values between each granular data point and a baseline value for each granular data point;
determining visual objects to display in a graphical user interface of an immersive media experience visualization based on the first difference value, wherein:
the visual objects are segmented into a plurality of groups of visual objects, and
each group of the plurality of groups of visual objects corresponds to one of the plurality of granular data points;
determining visual attributes for visual objects in each respective group of visual objects of the plurality of groups of visual objects based on a respective second difference value calculated for a respective granular data point corresponding to the respective group of visual objects, wherein:
the visual objects in the group of visual objects have a greater number of visual features relative to a baseline version of the respective visual object, wherein a value of the respective granular data point exceeds a baseline value, or
the visual objects in the group of visual objects have a smaller number of visual features relative to the baseline version of the respective visual object, wherein the value of the respective granular data point is less than the baseline value;
generating a first immersive media experience visualization of the data set including the determined visual objects having the determined visual attributes; and
transmitting the generated first immersive media experience visualization of the data set to an immersive experience viewer for display in a graphical user interface of the immersive experience viewer.

17. The non-transitory computer-readable medium of claim 16, wherein the first immersive media experience visualization further comprises a dashboard summarizing one or more portions of the data set, a plurality of information panes associated with the one or more objects, a values progress meter, and a virtual assistant.

18. The non-transitory computer-readable medium of claim 16, wherein the operation further comprises:
receiving, from a user, data defining a hypothetical scenario;
updating the data source based on the data defining the hypothetical scenario;
generating a second immersive media experience visualization of the updated data set; and
transmitting the generated second immersive media experience visualization of the data set to the immersive experience viewer for display.

19. The non-transitory computer-readable medium of claim 16, wherein the first immersive media experience visualization comprises a forest representing the data set, and wherein the one or more objects comprise one or more trees in the forest.

20. The non-transitory computer-readable medium of claim 19, wherein:
the visual features comprise foliage on the trees,
the greater number of visual features relative to the baseline version of the respective visual object comprises a larger amount of foliage on the trees relative to a baseline version of the trees, and
the smaller number of visual features relative to the baseline version of the respective visual object comprises a smaller amount of foliage on the trees relative to the baseline version of the trees.

* * * * *